United States Patent
Cassagne et al.

(10) Patent No.: US 12,334,731 B2
(45) Date of Patent: Jun. 17, 2025

(54) METHOD FOR EVALUATING PHOTOVOLTAIC ENERGY PRODUCTION AND EVALUATION AND MANAGEMENT UNIT IMPLEMENTING THE METHOD

(71) Applicant: TOTAL RENEWABLES, Courbevoie (FR)

(72) Inventors: Valérick Cassagne, Limours (FR); Mohammed Chiguer, Gif sur Yvette (FR)

(73) Assignee: TOTAL RENEWABLES, Courbevoie (FR)

( * ) Notice: Subject to any disclaimer, the term of this patent is extended or adjusted under 35 U.S.C. 154(b) by 608 days.

(21) Appl. No.: 17/602,640

(22) PCT Filed: Apr. 10, 2020

(86) PCT No.: PCT/EP2020/060337
§ 371 (c)(1),
(2) Date: Dec. 3, 2021

(87) PCT Pub. No.: WO2020/208237
PCT Pub. Date: Oct. 15, 2020

(65) Prior Publication Data
US 2022/0166217 A1    May 26, 2022

(30) Foreign Application Priority Data
Apr. 11, 2019  (FR) ...................................... 1903902

(51) Int. Cl.
*H02J 3/00*   (2006.01)
*H02J 3/38*   (2006.01)
*H02S 50/10*  (2014.01)

(52) U.S. Cl.
CPC .............. *H02J 3/004* (2020.01); *H02J 3/381* (2013.01); *H02S 50/10* (2014.12); *H02J 2300/26* (2020.01)

(58) Field of Classification Search
CPC ........ H02J 3/004; H02J 3/381; H02J 2300/26; H02S 50/10
(Continued)

(56) References Cited

U.S. PATENT DOCUMENTS

2010/0204844 A1   8/2010 Rettger et al.
2011/0282601 A1 * 11/2011 Hoff ........................ H02J 3/381
                                                   702/60

(Continued)

FOREIGN PATENT DOCUMENTS

CN    107276079    10/2017
CN    108268963    7/2018
(Continued)

OTHER PUBLICATIONS

Irradiance Forecasting for the Power Prediction of Grid-Connected Photovoltaic Systems, IEEE Journal of Selected Topics in Applied Earth Observations and Remote Sensing, vol. 2, No. 1, Mar. 2009, By: Lorenz (Year: 2009).*

(Continued)

*Primary Examiner* — Jigneshkumar C Patel
(74) *Attorney, Agent, or Firm* — McDonnell Boehnen Hulbert & Berghoff LLP

(57) ABSTRACT

The invention concerns a method for evaluating photovoltaic energy production for an energy supply facility (11) installed on a site (1), the energy supply facility (11) comprising at least one electricity production unit (12) having at least one photovoltaic module (14); characterized in that the photovoltaic energy production evaluation method comprises the following steps: —determining past (Continued)

or predictive irradiance values for the site (1) on which the energy supply facility (11) is installed, the determination being carried out for time intervals of between one second and two years, and —evaluating the photovoltaic power generated as a function of the determined irradiance values and numerical values prerecorded in a database (30), this database (30) including, for each day of the year and different times of each day, prerecorded numerical values for determining the photovoltaic electrical power generated as a function of the irradiance.

15 Claims, 9 Drawing Sheets

(58) Field of Classification Search
USPC .......................................................... 700/291
See application file for complete search history.

(56) References Cited

U.S. PATENT DOCUMENTS

| | | | | |
|---|---|---|---|---|
| 2012/0242321 | A1* | 9/2012 | Kasai | G01J 5/07 324/72 |
| 2014/0252855 | A1* | 9/2014 | Watanabe | H02J 3/381 307/31 |
| 2016/0011617 | A1* | 1/2016 | Liu | H02J 3/14 700/287 |
| 2018/0034411 | A1* | 2/2018 | Charles | H02S 50/10 |
| 2018/0175660 | A1* | 6/2018 | Hara | H02J 3/381 |
| 2018/0175790 | A1* | 6/2018 | Sanfilippo | G01R 21/133 |
| 2018/0196896 | A1 | 7/2018 | Arai et al. | |

FOREIGN PATENT DOCUMENTS

| | | |
|---|---|---|
| GB | 2446418 | 8/2008 |
| JP | 2011259656 | 12/2011 |
| JP | 2012010508 | 1/2012 |
| JP | 2013164286 | 8/2013 |
| JP | 2013258853 | 12/2013 |
| JP | 2018148743 | 9/2018 |

OTHER PUBLICATIONS

Office Action from European counterpart application EP 20 717 881.5, issued Dec. 6, 2022.
Office Action from Japanese counterpart application JP 2021-560443, issued Jan. 30, 2024.
Office Action for corresponding Japanese case (Appl. No. 2021-560443) issued on May 16, 2024, with English translation.
Office Action for corresponding European case (Appl. No. 20 717 881.5) issued on May 27, 2024, with English translation.
Office Action for corresponding Chinese case (Appl. No. 202080042739.2) issued on Jan. 17, 2025, with English translation.

* cited by examiner

| | 01/01 00:00 | 01/01 01:00 | 01/01 02:00 | ... | 01/01 12:00 | ... | 01/01 16:00 | ... | 20/07 10:00 | 20/07 11:00 | ... | 31/12 22:00 | 31/12 23:00 |
|---|---|---|---|---|---|---|---|---|---|---|---|---|---|
| Coeff. A | 0 | 0 | 0 | ... | $3.8502 \times 10^{-6}$ | ... | $4.1993 \times 10^{-7}$ | ... | $-4.6074 \times 10^{-6}$ | $-8.6432 \times 10^{-7}$ | ... | 0 | 0 |
| Coeff. B | 0 | 0 | 0 | ... | $-8.0317 \times 10^{-3}$ | ... | $-8.7989 \times 10^{-4}$ | ... | $3.1851 \times 10^{-3}$ | $-4.1908 \times 10^{-4}$ | ... | 0 | 0 |
| Coeff. C | 0 | 0 | 0 | ... | $4.3233 \times 10^{0}$ | ... | $-2.5195 \times 10^{-1}$ | ... | $3.4227 \times 10^{0}$ | $1.7189 \times 10^{0}$ | ... | 0 | 0 |
| Coeff. D | 0 | 0 | 0 | ... | $6.2905 \times 10^{0}$ | ... | $5.1523 \times 10^{1}$ | ... | $4.7805 \times 10^{0}$ | $5.8910 \times 10^{0}$ | ... | 0 | 0 |
| Coeff. E | 0 | 0 | 0 | ... | 0 | ... | 0 | ... | 0 | 0 | ... | 0 | 0 |

Figure 5

METHOD FOR EVALUATING PHOTOVOLTAIC ENERGY PRODUCTION AND EVALUATION AND MANAGEMENT UNIT IMPLEMENTING THE METHOD

CROSS REFERENCE TO RELATED APPLICATION

This application is a U.S. National Phase of International Application No. PCT/EP2020/060337, filed Apr. 10, 2020, which claims priority to French Patent Application No. 1903902, filed Apr. 11, 2019, both of which are incorporated by reference herein in their entirety.

TECHNICAL FIELD

The present invention concerns the field of evaluating photovoltaic energy production. More particularly, the present invention concerns a method for evaluating photovoltaic energy production and an evaluation and management unit implementing this method.

STATE OF THE ART

Due to the rising cost of fossil fuels and the increased pollution generated by the consumption of these fossil fuels, attention is turning increasingly to renewable energy resources and the consumption of energy along the lines of sustainable development. This tendency naturally favors renewable energies such as solar energy. It is now common practice to install photovoltaic panels, particularly on the roofs of businesses, public buildings or simply on the roofs of private dwellings for own-consumption or to supply for example the entire production or just the surplus energy to the public network.

Positive-energy districts are currently being developed. The purpose of these districts is to be self-sufficient in electricity by generating the energy that they consume in a renewable manner. An example of this is the IssyGrid project, which is an experimental project that groups private dwellings and offices together. For this project, different places have been equipped in particular with photovoltaic modules so as to be capable of producing electrical energy to meet the energy demands of the facilities in this district.

The different electrical appliances of these facilities are for example interconnected in a network and can also be controlled in order to optimize their operation as a function of the quantities of electricity produced instantaneously and/or the quantities stored, for example in accumulators, while limiting the backup electricity coming from the public network to which the district is of course connected.

Different control modules also exist, enabling the consumption of different electrical devices to be limited in order to control in particular the optimized operation of an air-conditioning or heating (reversible heat pumps) facility, household appliances (washing machine, dishwasher, water heater) or even lighting.

Thus, the purpose of the IssyGrid project is to create a district that can generate its own energy, and potentially be capable of injecting surplus renewable electrical energy into the public electricity network.

In order to at least partially achieve such autonomy, it must therefore be possible to evaluate the photovoltaic power generated in a predictive manner, which, in the event of insufficient renewable electrical energy production faced with a high energy demand for example, makes it possible to choose on the one hand, between an electrical energy backup from the public network or from electricity stored in accumulators and on the other, simply withdrawing some consumers deemed for example to be non-critical.

In fact, it may be necessary to implement storage solutions, to warn the public network operator or to draw from the storage units if the quantity of available or produced renewable energy is insufficient or in a state of oversupply to meet the energy demand of the various consumers in this district or to limit certain identified electricity consumers.

Such a situation can for example occur in the case of a harsh winter during which renewable energy production capacities are well below demands or by contrast in summer with a high photovoltaic production and a low summer and daytime consumption.

In the context of the design of photovoltaic facilities, some software is currently known that allows a renewable electrical energy production prediction to be calculated. This software is used to determine for a future production site the sizing of the photovoltaic facilities and generally takes into consideration historic meteorological data.

These historic meteorological data include for example the levels of sunlight at different periods of the year in the geographical zone intended for this facility.

This software is developed principally to calculate the return on investment and thus the financial viability of such a project.

In more sophisticated versions for projects with self-consumption, some software also takes into account the consumer side and electrical energy needs of a more complex facility comprising electrical energy production units, electrical energy storage units and electrical energy consumption units.

However, this software is not suitable for predicting in a reliable or practical manner the photovoltaic power generated by the production unit for future periods, particularly from day to day and with a sufficiently precise sampling interval throughout the day. In fact, the photovoltaic power generated by the electricity production unit is dependent on instantaneous meteorological conditions. These meteorological conditions can vary from one day to the next or even during the same day.

Moreover, the calculations made by this software are quite complex and long, which makes it unsuitable for making a predictive evaluation enabling for example the supply of energy or the consumption of electrical appliances to be adapted in real time.

Moreover, known photovoltaic simulation software, originally designed for an annual performance evaluation, often has a calculation interval in the order of one hour that cannot be adjusted, which is far too long for a same-day evaluation that requires the prediction to be evaluated for an order of magnitude of one minute.

Thus, this software, although very efficient in modeling and ergonomics, is not suitable for predicting the production of photovoltaic energy for short periods, is not accurate and requires a considerable calculation time.

In order to satisfy the energy demands of the different facilities of these positive energy districts, it must therefore be possible to predict the photovoltaic power generated in real time, and possibly activate the supply or injection of electricity into these facilities from the public network, to activate storage units or to order the reduction in consumption or switching on of certain identified consumers or electrical appliances in the district.

In the case of hybrid electrical systems, particularly with thermoelectric generators such as diesel generator sets, the short-term photovoltaic prediction allows a reduction in solar production due to passing clouds for example to be anticipated and one or more generators to be switched on in advance and a forced withdrawal or even a blackout to be avoided. In return, a reliable prediction enables the number of generators in operation to be minimized and fuel consumption and the need for maintenance to be reduced while guaranteeing the reliable supply of electricity.

One of the aims of the invention is therefore to provide a solution to enable real-time evaluation of the photovoltaic production of a facility without resorting to complex calculations.

Another aspect concerns controlling the power generated for the purpose of diagnostics. In fact, by evaluating a theoretical photovoltaic energy production according to the actual meteorological conditions in a sufficiently precise manner for the production unit during a past time interval and by comparing this theoretical production to the actual production of electricity by the production unit during the same time interval, it is possible to determine an operating state of the production unit and, in the event of too great a discrepancy, to schedule the necessary maintenance operations for example.

In fact, if the quantity of electrical energy produced is too small compared to the expected power, it can be deduced that the production unit has a technical problem such as, for example, a fault with the module chain or inverter, or a deposit of dust or dirt, etc.

The aim of the present invention is therefore to overcome, at least partially, the above-described problems of the prior art by proposing a simplified method of evaluating photovoltaic energy production enabling monitoring, diagnostics or a prediction of the production of photovoltaic energy.

DISCLOSURE OF THE INVENTION

For this purpose, the subject matter of the invention is a method for evaluating photovoltaic energy production for an energy supply facility installed on a site, the energy supply facility comprising at least one electricity production unit having at least one photovoltaic module;
characterized in that the photovoltaic energy production evaluation method comprises the following steps:
determining past or predictive irradiance values for the site on which the energy supply facility is installed, the determination being carried out for time intervals of between one second and two years, and
evaluating the photovoltaic power generated as a function of the determined irradiance values and numerical values prerecorded in a database, this database including, for each day of the year and different times of each day, prerecorded numerical values for determining the photovoltaic electrical power generated as a function of the irradiance.

The different steps of the method are for example performed automatically by an evaluation and management unit comprising processing means or a computer system such as a microprocessor or a microcontroller. The capacity of these processing means can be limited by the fact of using a database, as will be described later in the description. In particular, the values of the photovoltaic power generated are read by processing means and can be stored and processed subsequently.

Using a database, in the form of a table for example, in order to determine the photovoltaic power generated by the electricity production unit by introducing irradiance limits the calculation powers required to determine this generated photovoltaic power.

Thus, using such a database facilitates calculations and therefore makes it simpler and quicker to determine the photovoltaic power generated at any time of the day. Moreover, using such a database enables the determination of the photovoltaic power generated by the electricity production unit to be automated.

The invention may also comprise one or more of the following aspects taken alone or in combination:

According to one aspect, the numerical values prerecorded in the database correspond to photovoltaic electrical power values generated as a function of irradiance values.

The database comprises for example for each moment contained in the database electrical power values generated as a function of different levels of irradiance, the levels of irradiance ranging between 0 and 1300 W/m$^2$, in particular by increments of 10 W/m$^2$.

For a level of irradiance that is not indicated in the database and is located between two levels indicated in the database, the value of the photovoltaic electric power can be determined by linear interpolation of the photovoltaic electrical power values indicated in the two levels of irradiance indicated in the database.

According to another aspect, the numerical values prerecorded in the database correspond to coefficients of a mathematical function describing values of electrical power generated as a function of irradiance.

The mathematical function can be a polynomial, in particular a 4th degree polynomial.

The coefficients of the mathematical function are in particular determined by least-square regression of values of electrical power generated as a function of different irradiance values, the irradiance values ranging between 0 and 1300 W/m$^2$ for example.

The method can comprise a step to correct the photovoltaic electrical power generated as a function of irradiance, this correction step taking into account predictive, past or measured values of temperature and/or wind speed on the installation site by applying a correction coefficient.

The correction coefficient is in particular a linear correction coefficient.

The prerecorded numerical values are for example indicated in the database at least between the sunrise and sunset of each day with the times of day spaced over a time of between 5 min and 2 h, in particular 1 h.

For a time of day that is not indicated in the database and is located between two times indicated in the database, the prerecorded numerical values can be determined by linear interpolation of the prerecorded numerical values indicated at the two times indicated in the database.

The evaluation of electrical energy production is in particular made at a sampling interval of five minutes or less, and in particular every second.

The invention also concerns a method for predicting photovoltaic energy production and managing the electrical appliances for an energy supply facility installed on a site equipped with at least one electricity production unit having at least one photovoltaic module (14), involving the following steps:
executing a method for evaluating the photovoltaic energy production as defined above, wherein during the step of determining the irradiance values, predictive irradiance values are determined for the site on which the energy supply facility is installed, said determination being made for a predictive time interval of between one second and two days, and adapting a method of operation of at least one electrical appliance as a function of the evaluation of the production of photovoltaic energy by the energy supply facility.

The invention also concerns a method of monitoring and diagnosing photovoltaic energy production for an energy supply facility installed on a site, the energy supply facility comprising at least one electricity production unit having at least one photovoltaic module, involving the following steps:
executing a method for evaluating the photovoltaic energy production as defined above, wherein during the step of determining the irradiance values, the historic irradiance values for the site on which the energy supply facility is installed are determined for a past time interval, and
comparing the photovoltaic energy production evaluated with the photovoltaic production measured during the past time interval.

According to an additional aspect, the method also comprises a step of generating a warning if the difference between the production of photovoltaic energy evaluated and the photovoltaic production measured during the past time interval exceeds a predefined threshold.

The invention also concerns an evaluation and management unit comprising means configured to implement a method as defined above.

The invention furthermore concerns a computer program product that can be loaded into the internal memory of an evaluation and management unit comprising portions of software code to execute the steps of a method as defined above when said computer program is executed by a computer.

BRIEF DESCRIPTION OF THE DRAWINGS

Further features and advantages of the invention will emerge from the following description, given by way of non-limiting example, with reference to the accompanying drawings, in which:

FIG. 5 is an example of an extract of a schematic representation of a database for evaluating the photovoltaic power generated as a function of the irradiance and the time of year for the energy supply facility on the site in FIGS. 1 and 2 with coefficients of a polynomial function;

DETAILED DESCRIPTION

Figure 1:
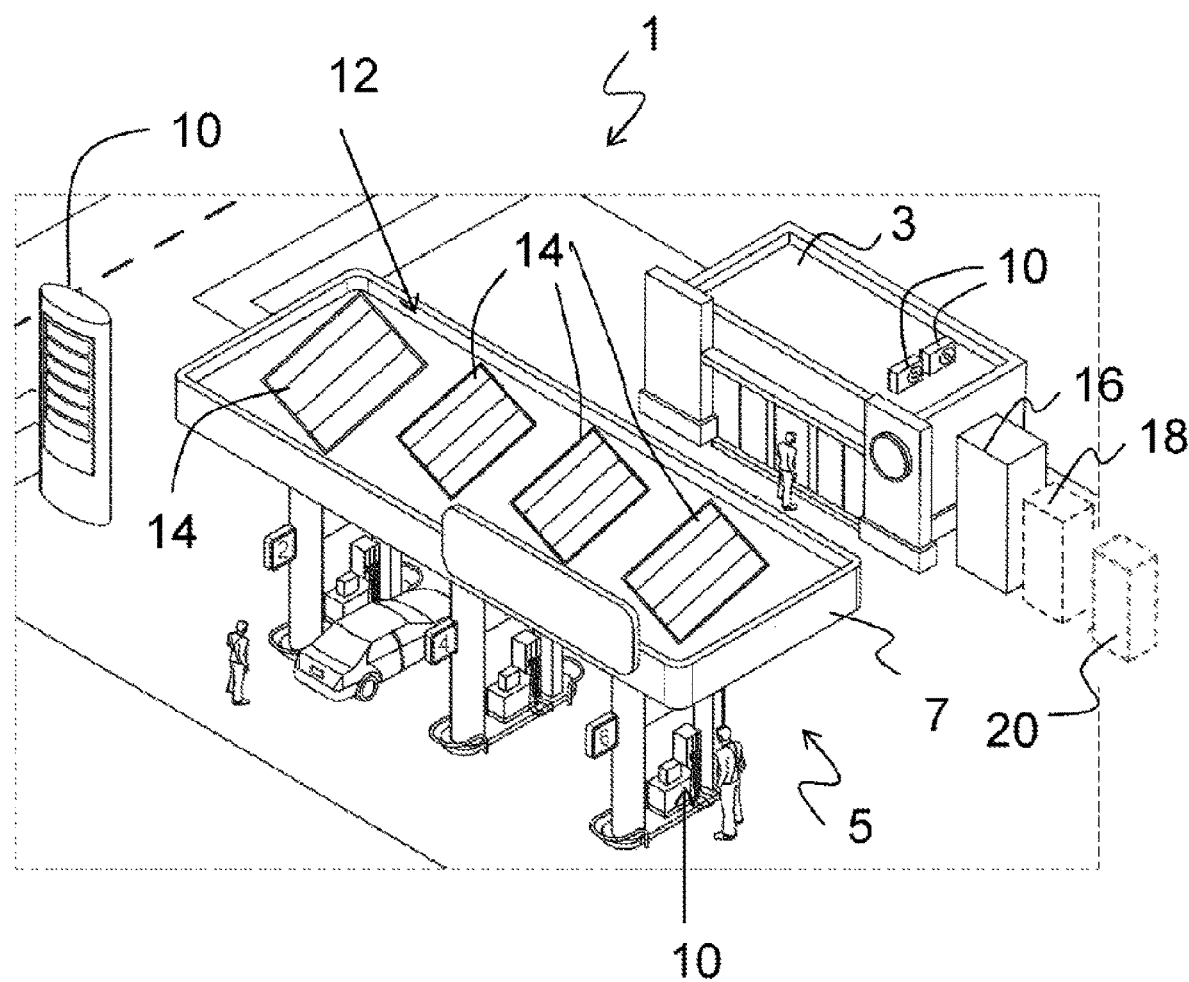
FIG. 1 is a schematic perspective representation of a site equipped with a renewable energy supply facility.

In all of the Figures, elements that have identical functions bear the same reference numerals.

The following embodiments are examples. Although the description refers to one or more embodiments, this does not necessarily mean that each reference concerns the same embodiment or that the characteristics apply only to one embodiment. Single characteristics of different embodiments can also be combined or interchanged to provide other embodiments.

Definitions

In the following description, "photovoltaic module" means the most basic (direct current) electrical energy production unit, consisting of an assembly of photovoltaic cells connected together and completely protected from the external environment, that is to say, as defined by Standard IEC-TS61836.

In the following description, "real time" means an evaluation sampling interval of 10 minutes or less, and in particular 5 minutes or less, in particular every minute.

In the following description, "irradiance" or flux density according to Standard ISO 80000-7 § 19 means a quantification of a power of electromagnetic radiation striking a surface unit. Irradiance corresponds to the surface density of the energy flow arriving at the considered point of a surface. This surface density is expressed in Watts per square meter ($W/m^2$) for the entire solar spectrum or a defined part of the spectrum. Irradiance can in particular be "Global Horizontal Irradiance" (GHI), the irradiance in a fixed or variable defined plane like the module plane, diffuse irradiance and/or normal direct irradiance or a combination of this information.

In French, the word "temps" can be associated with chronology or meteorology. In the present description, the word "temps" will be used only to describe time elements, and the words meteorology or meteorological to describe elements associated with meteorology.

"Meteorological parameter" means any parameter connected with meteorology that can have an influence on the operation and in particular the efficiency of photovoltaic modules, such as the irradiance value, temperature and/or wind speed on the installation site.

"Time interval" means the time between the start and the end of the evaluation period or the prediction period. The predictive time interval is the time between a predictive moment in the future and the present moment. If the predictive time interval is 36 h, this makes it possible to have, for example, at the present moment a prediction of the values of a meteorological parameter between now and in 36 h.

"Sampling interval" means the time between two moments for example required to determine irradiance values or the time between photovoltaic energy production evaluation points in "the time interval." Thus for a predictive time interval of 36 h and a sampling interval of 5 minutes, we can calculate for between now and in 36 h that for every 5 min the production of photovoltaic energy is 36×60/5+1=433 values of future productions.

Site

FIG. 1 shows a site 1, a commercial site for example, such as a service station with in particular a retail building 3 and a fuel distribution structure 5 with a roof 7, for example in the form of a canopy. Various electrical appliances 10 are also installed on this site 1.

The electrical appliances 10 are for example heat pumps, an air-conditioning system, lighting and/or display devices, fuel distribution pumps, or even automatic dispensers.

Also installed on this site 1 is an electrical energy supply facility 11 (see FIG. 2) that comprises at least one electricity production unit 12 having at least one, preferably a multitude, of photovoltaic modules 14 and an evaluation and management unit 16.

Each photovoltaic module 14 of this electricity production unit 12 has known characteristics of production, and particularly of electrical power generated as a function of sunlight, more specifically as a function particularly of irradiance as well as, for example, temperature. Photovoltaic modules 14 of known technologies can be used, for example modules with for example crystalline silicon photovoltaic cells (not shown).

As can be seen in FIG. 1, the photovoltaic modules 14 are for example installed on the roof 7 of the fuel distribution structure 5.

The electrical energy supply facility 11 also optionally comprises a storage unit 18 for the electrical energy produced by the electricity production unit 12 and/or a thermoelectric generator 20.

This storage unit 18 can for example be an electric battery or an electrical energy accumulator.

The thermoelectric generator 20 can be formed by a diesel generator set that can be switched on to provide backup power for example in the event of failure or outage of the public electricity network or if it is economically more advantageous to turn on the generator than to draw on the public network.

Clearly, other embodiments are envisaged where the site 1 can be residential housing and/or an industrial complex comprising individual or collective homes, offices or even industrial buildings.

Figure 2:
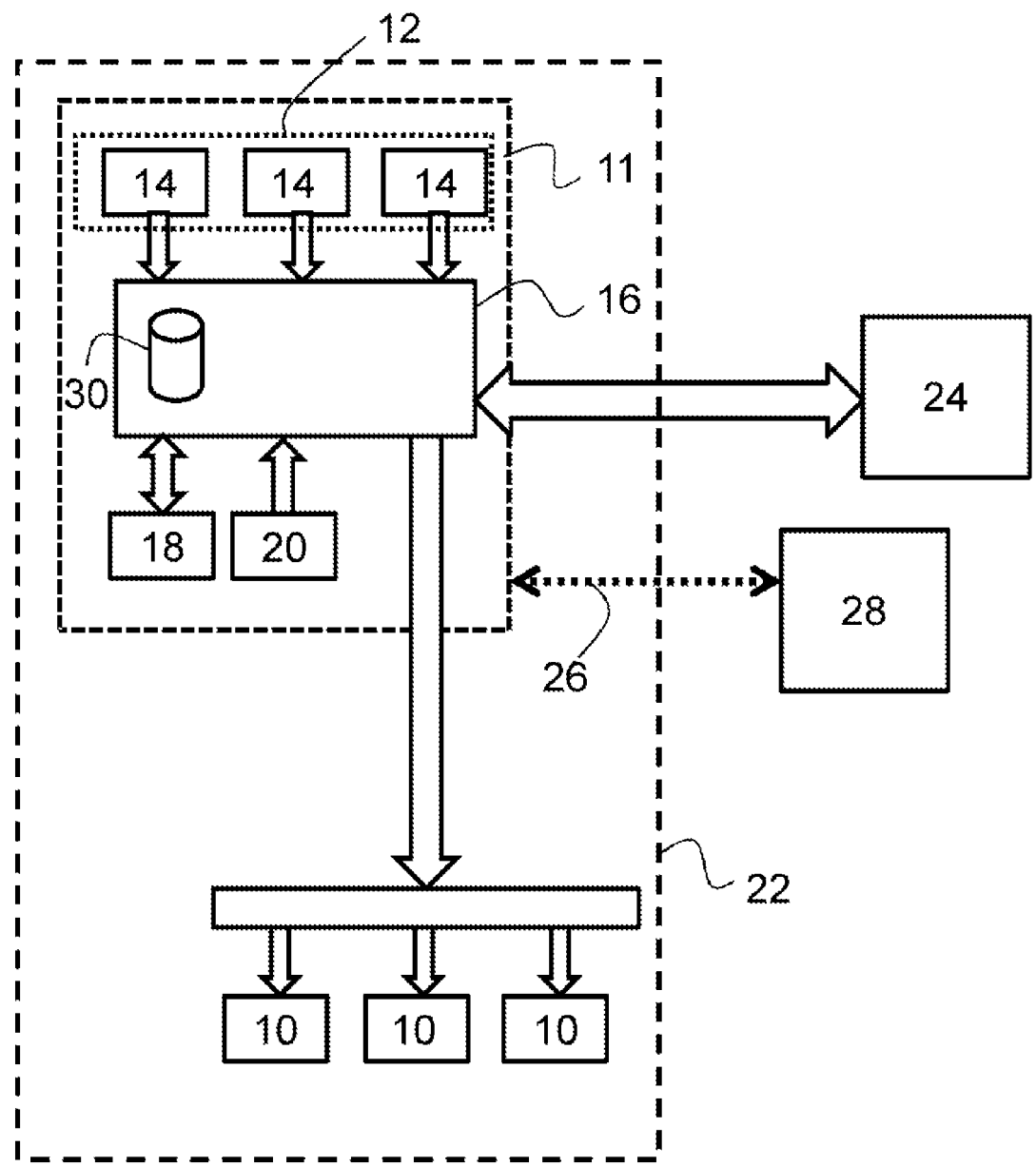
FIG. 2 is a synoptic representation of a local electricity network comprising an electrical energy supply facility.

As shown schematically in FIG. 2, the electrical energy supply facility 12 and the electrical appliances 10 are for example interconnected in a local electrical network 22 controlled by the evaluation and management unit 16.

As will be described in greater detail below, the evaluation and management unit 16 is configured to analyze the production of electrical energy by the electricity production unit 12, to analyze the electricity requirements of the electrical appliances 10 and to control for example the storage unit 18 and/or one or more thermoelectric generators 20 and the flows of electricity between the various units of the local electrical network 22. This local electrical network 22 is also connected to the public electricity network 24 that can receive the surplus electricity produced by the energy supply facility 12 or allows the supply to be backed up or replaces, completely or partially, the electricity production unit 12 as the case may be.

For this purpose, the evaluation and management unit 16 is for example configured to activate/deactivate/control switches, relays and/or converters (not shown) arranged in this local network 22 and to manage the various flows of electricity.

Thus, the electrical energy produced by the electricity production unit 12 can be consumed directly by the electrical appliances 10, be stored by the storage unit 18 or be supplied to the public network 24 depending for example on which is economically the most advantageous for the operator of the site 1.

The electrical energy stored by the storage unit 18 can for example be supplied to the electrical appliances 10, particularly in the event of insufficient electrical energy produced by the production unit 12.

The electrical energy of the public network 24 can for example be supplied to the electrical appliances 10, particularly in the event of insufficient electrical energy produced by the production unit 12 and/or the thermoelectric generator 20 or insufficient electrical energy available in the storage unit 18.

Lastly, the electrical energy produced by the local thermoelectric generator 20 such as diesel generator sets that can be switched on in order to ensure backup power for example in the event of failure or outage of the public network 24, can be supplied to the electrical appliances 10.

In order for the evaluation and management unit 16 to be able to implement these choices, it is therefore necessary to predict in real time the production of photovoltaic energy achieved by the electricity production unit 12, which is highly dependent on the meteorological conditions on the site 1, and to take into account the electricity requirements of the various appliances 10 consuming electricity, but also the conditions of buying back or selling electricity through the public network 24.

In a more advanced variant, the evaluation and management unit 16 is configured to control more finely the energy consumption of at least some of the electrical appliances 10, for example to limit the consumption of some electrical appliances 10 over a given period. In particular, this increases the energy self-sufficiency of the site 1 by limiting consumption on the public network 24 and thus optimizing the energy bill for the site 1. In the case of an air-conditioning system for example, the evaluation and management unit 16 can be configured to raise the setpoint temperature, for example by one degree in order to limit consumption.

The predictive aspect may also be necessary in order to alert the operator of the public network 24 so as to be authorized to draw from or inject into the public network 24 a certain electrical power without penalties or simply to be able to switch on the thermoelectric generator 20 in time.

For this purpose, the evaluation and management unit 16 is in particular connected by telecommunication means 26 to a meteorological evaluation system 28 configured to communicate predictive or historical meteorological parameters to it such as irradiance values, wind speed or the temperature at the site 1 on which the electricity production unit 12 is installed. The meteorological evaluations system 28 is located remotely and comprises for example a remote server.

The evaluation and management unit 16 is for example a computer equipped with memory and one or more processors or microcontrollers as well as communication means configured to communicate and control the energy supply facility 11 as well as the electrical appliances 10, to communicate with the meteorological evaluations system 28 and also with for example the operator of the public network 24. This evaluation and management unit 16 can be installed on the site 1 or be installed remotely.

The evaluation and management unit 16 is configured to implement a method for evaluating the photovoltaic energy production of the energy supply facility 11 and in particular of the electricity production unit 12 by using a database 30 comprising for each day of the year and different moments of each day prerecorded numerical values allowing the photovoltaic electrical power generated as a function of irradiance to be determined.

For this purpose, the evaluation and management unit 16 is configured to access a database 30, which can be recorded in a memory of the evaluation and management unit 16 (as shown schematically in FIG. 2) or be located on a remote server.

According to a first embodiment, the prerecorded numerical values correspond to photovoltaic electrical power values generated as a function of irradiance by the electricity production unit 12.

Figure 3:
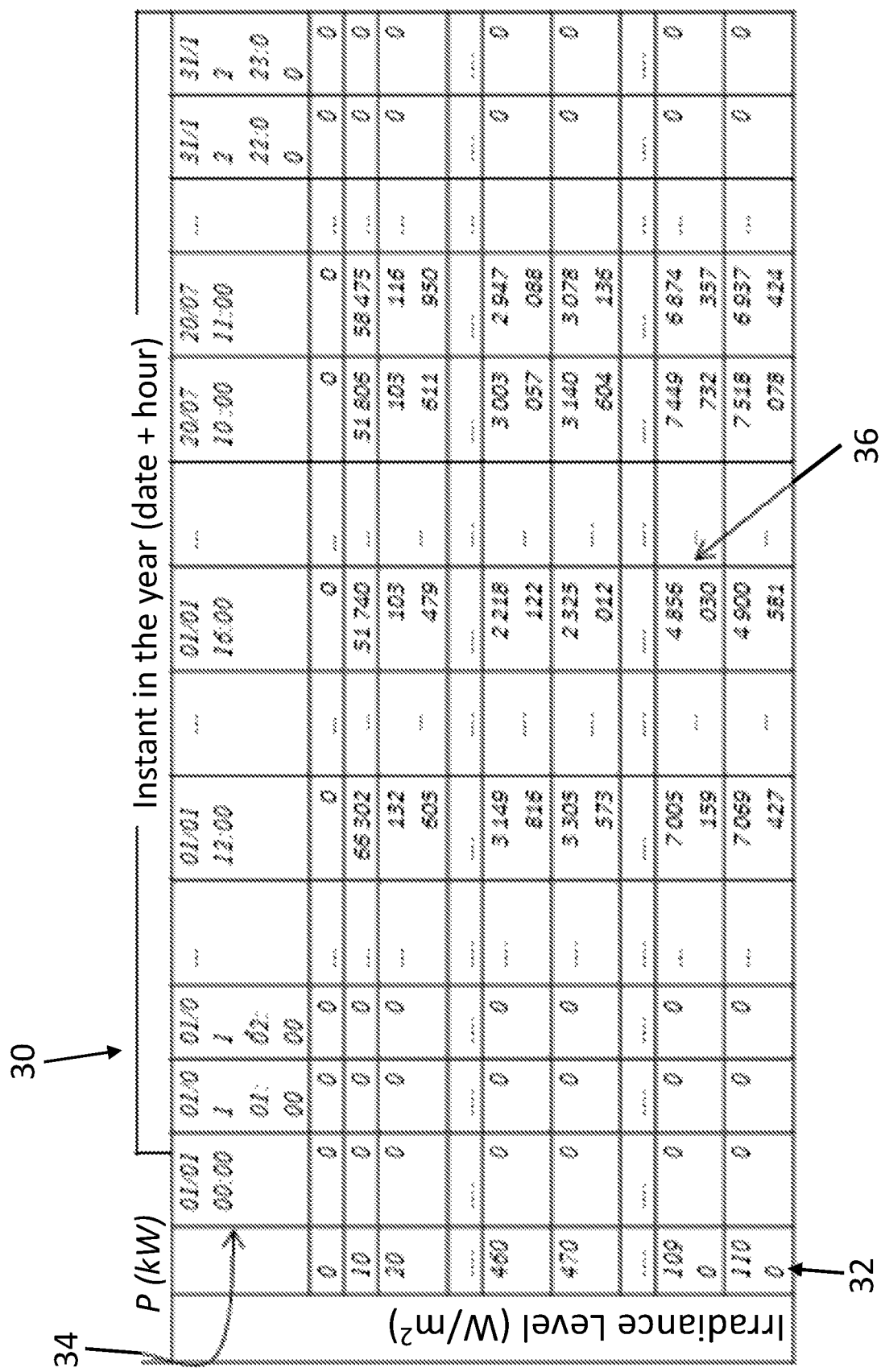
FIG. 3 is an example of an extract of a schematic representation of a database for evaluating the photovoltaic power generated as a function of the levels of irradiance and the time of year for the energy supply facility on the site in FIGS. 1 and 2.

An example of presentation and content of this database 30 is shown in FIG. 3 in the form of a table.

This database 30 comprises for each day of the year and for different moments of each day photovoltaic power values generated as a function of irradiance.

More precisely, this database 30 comprises on the y-axis 32 in increments of 10 W/m² for example levels of irradiance. In the present embodiment, the irradiance values range from 0 to 1300 W/m², in the present case between 0 and 1100 W/m². This range of levels appears sufficient because, generally, the irradiance of a surface normal to the direct rays of the sun is around a maximum of 1000 W/m².

The x-axis 34 shows the moments in the year referenced for example by a date and the time. In the present embodiment, each day of the year is present in this table of the database 30 (from 1 January (01/01) to 31 December (12/31)) and for each day, different moments referenced by a time are shown, for example, twenty-four moments ranging from 00:00 to 23:00 by intervals of one hour.

Clearly, the database table 30 can be modified without departing from the scope of the present invention. Thus, the interval of time of the various moments can be longer or shorter than one hour and can have more (or fewer) than twenty-four moments per day. Also, the night hours when the irradiance value is zero or negligible can also be implicitly ignored by only listing in this table of this database 30 the moments between sunrise and sunset that can be easily determined by astronomical calculations.

The database 30 in FIG. 3 therefore indicates photovoltaic power values 36 generated as a function of irradiance 32, at least between sunrise and sunset each day with moments of the day spaced over intervals of time, preferably regular, ranging between 30 min and 2 h, in particular 1 h.

More particularly, each day of the year can be divided into hours, i.e. 8760 time intervals for a common year.

Over a range of 0 to 1100 W/m² and by increments of 10 W/m², for each level of irradiance and for each moment of the year contained in the database 30, a power value 36 is prerecorded, corresponding to a photovoltaic power generated by the electricity production unit 12.

Consequently, if for example a global horizontal irradiance of 470 W/m² is received on January 1 at 12:00, the photovoltaic power generated by the electricity production unit 12 can be evaluated at 3,305,573 kW for example. At 16:00, this same irradiance produces a photovoltaic power of 2,325,012 kW.

It is therefore clear that, on the basis of an irradiance value, which can be a predictive or historic value, the photovoltaic power generated by the electricity production unit 12 can very easily be evaluated.

This database 30 thus takes into account according to the date and predefined geographical zone, for astronomical reasons, the angle formed between the direct rays of sunlight and the surface of the photovoltaic modules 14 that varies as a function of the seasons and the time of day.

If the irradiance value 32 determined by the meteorological evaluations system 28 is not exactly one of the prerecorded irradiance levels of the database 30, a linear correction for example can be made in order to approximate for example by interpolation the photovoltaic power 36 generated in these particular conditions.

Let us take for example a predicted irradiance 32 of 468 W/m² at a given time of a day, such as 10:00 on July 20 for example. In such a case, the following calculation can be made:

$$P1(E_e=468 \text{ W/m}^2)=P1(E_e=460 \text{ W/m}^2)+8/10(P1(E_e=470 \text{ W/m}^2)-P1(E_e=460 \text{ W/m}^2)) \quad \text{[Math. 1]}$$

wherein:

P1 corresponds to the photovoltaic power 36 generated for a predicted irradiance 32 at a given moment T; and $E_e$ corresponds to a predicted irradiance value 32.

According to the data in FIG. 3, on July 20 at 10:00, $$P1(E_e=468 \text{ W/m}^2)=3003057+8/10(3140604-3003057)=3113094 \text{ kW}$$

On the other hand, if the time chosen for evaluating the power is not precisely at the time indicated in the database 30 of FIG. 3, a linear correction can also be made in order to determine the photovoltaic power 36 generated at that precise moment.

For example, the prediction of the irradiance 32 might possibly be made on July 20 at 10:15. In such a case, and in order to predict the photovoltaic power 36 generated at that precise time on July 20 and for a predetermined interval of time, the following calculation can be made:

$$P2(10:15)=P3(10:00)+15/60(P2(11:00)-P2(10:00)) \quad \text{[Math. 2]}$$

wherein:

P2 corresponds to the photovoltaic power generated at a particular moment of the day for a given irradiance.

According to the data in FIG. 3, on July 20 for 468 W/m²,

For 10:00:

$$P2(10:00)=P1(E_e=468 \text{ W/m}^2)=3003057+8/10(3140604-3003057)=3113094 \text{ kW}.$$

For 11:00:

$$P2(11:00)=P1(E_e=468 \text{ W/m}^2)=2947088+8/10(3078136-2947088)=3051926 \text{ kW}$$

and so for 10:15

$$P2(10:15)=3113094+15/60(3051926-3113094)=3097802 \text{ kW}$$

As the corrections are in this case linear, they can be made firstly at the level of the irradiance then at the intra-interval moment or in the reverse order.

According to a second embodiment that allows the size of the database 30 to be further reduced, the prerecorded numerical values correspond to coefficients of a mathematical function, in particular a 4$^{th}$ degree polynomial function for example, describing values of electrical power generated as a function of the irradiance within a range of irradiance values of between 0 and 1300 W/m².

Figure 4:
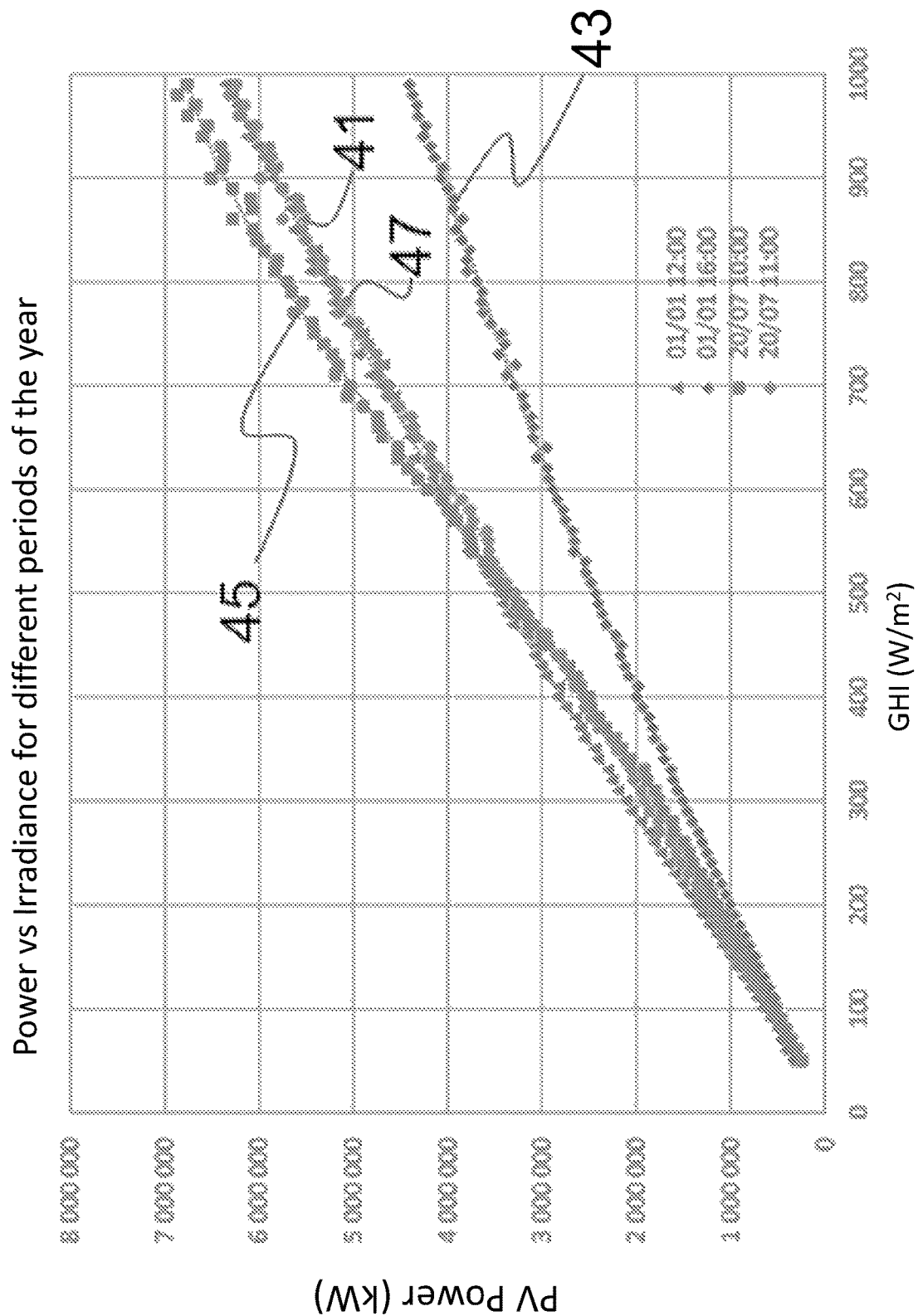
FIG. 4 is an example of a graph showing for several times in the year the photovoltaic power generated as a function of the irradiance for the energy supply facility on the site in FIGS. 1 and 2.

For example, if the values of photovoltaic power 36 as a function of the irradiance levels 32 are plotted for different moments of the year, the graphs shown in FIG. 4 are obtained.

Thus the curves 41 (triangles), 43 (diamonds), 45 (squares) and 47 (circles) show respectively the values of photovoltaic power 36 as a function of the irradiance levels 32 for 01/01 at 12:00, 01/01 at 16:00, 07/20 at 10:00 and 07/20 at 11:00.

By using for example an interpolation by a $4^{th}$ degree polynomial function as a mathematical function by a least-squares regression, it is possible to determine the coefficients that will be prerecorded as numerical values in the database 30 in order to calculate the photovoltaic electrical power generated as a function of the irradiance by the electricity production unit 12.

More specifically, from the values of the calculations of the modeling described in the following paragraph shown graphically in FIG. 4, the power 36 vs irradiance 32 relation can be modeled by a $4^{th}$ degree polynomial by least-squares regression. This polynomial is written $$P(Ee) = A \times Ee^4 + B \times Ee^3 + C \times Ee^2 + D \times Ee + E$$

From this regression it is possible to deduce the 5 coefficients A, B, C, D and E that will be recorded in the database 30 for the moment of the year defined as illustrated in FIG. 5 showing an example of presentation and content of this database 30 in the form of a table with the different coefficients.

Also for this embodiment, this database 30 comprises for each day of the year and for the different moments of each day a set of coefficients, for example A, B, C, D, E, enabling the photovoltaic power values generated as a function of irradiance to be calculated with the aid of a mathematical function.

All that is required to evaluate the photovoltaic power of the electricity production unit 12, for an irradiance 32 resulting from measurement or prediction, is to recover coefficients A to E corresponding to the moment of evaluation in the database 30 and to calculate the power 36 with the polynomial using these coefficients. For example, in order to determine the power 36 on July 20 at 10:00, coefficients A to E at that moment of the year extracted from the database are respectively: $-4.6074 \times 10^{-6}$, $3.1851 \times 10^{-3}$, $3.4227 \times 10^{0}$, $4.7805 \times 10^{3}$, $0 \times 10^{0}$. The photovoltaic power 36 for a GHI of 468 W/m² will be:

$$P(468) =: -4.6074 \times 10^{-6} \times 468^4 + 3.1851 \times 10^{-3} \times 468^3 + 3.4227 \times 10^{0} \times 468^2 + 4.7805 \times 10^{3} \times 468 + 0 \times 10^{0} = 3,092,387 \text{ kW}$$

Compared to the first embodiment, this method requires no irradiance interpolation calculation to process a precise irradiance level. By contrast, an interpolation must always be made to evaluate the power at a moment between 2 time intervals of the database, as described above. In the example previously mentioned, in order to evaluate the power at 10:15 under a GHI of 468 W/m², $$P2(10:00) = 3,092,387 \text{ kW}$$

$$P2(11:00) = 3,048,581 \text{ kW}$$

$$P2(10:15) = 3092387 + 15/60(3048581 - 3092387) = 3081435 \text{ kW}$$

That is, only one difference of 0.5% compared to the first embodiment.

This second embodiment of the database 30 describing the performance of the electricity production unit 12 as a function of irradiance and time is more compact with only five prerecorded numerical values per time interval instead of 111 given in the case of the base with 10 W/m² increments between 0 and 1100 W/m², that is to say a storage requirement of approximately 22 times less.

Mathematical models other than $4^{th}$ degree polynomials can be used to describe the performance of the power 36 as a function of the irradiance 32 by using other mathematical functions or other regressions or other methods for determining the coefficients. The methods chosen will influence the size of the database and the calculation capacity requirements.

Thus, the photovoltaic production of the electricity production unit 12 can be accurately evaluated at each moment of the year and for all irradiance conditions.

In order for this evaluation to be as accurate as possible, particular care has been taken with the calculation and makeup of the database 30, as will be described in detail below.

Creating and Using the Database 30

Figure 6:
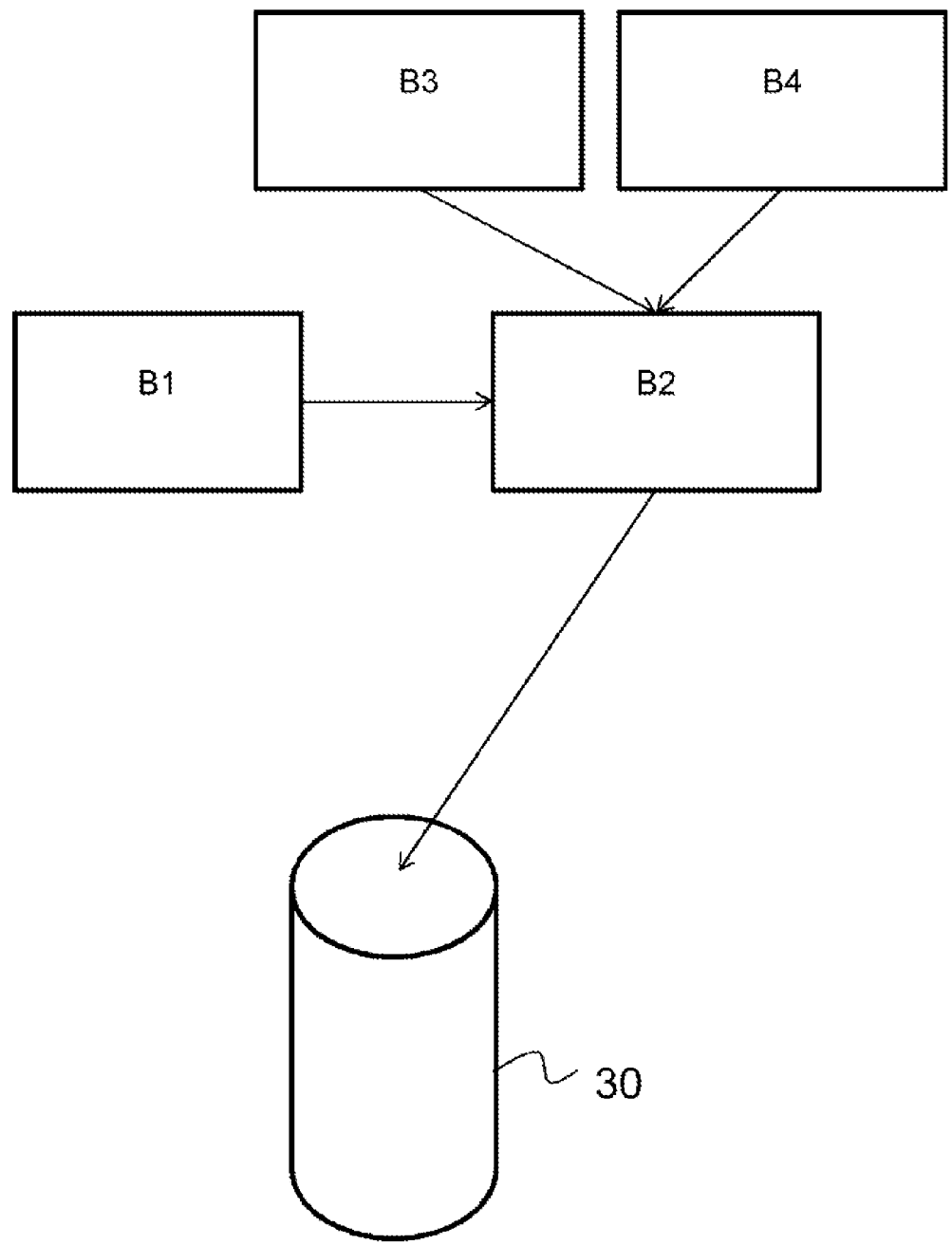
FIG. 6 is a diagram to show the make up of the database for evaluating a photovoltaic power generated by the energy supply facility on the site in FIG. 1.

FIG. 6 is a simplified and schematic representation of the operational blocks enabling the database 30 to be formed. Block B1 represents the modeling of the energy supply facility 11 and in particular the electricity production unit 12 as a whole, previously mentioned, and block 2 represents a known sizing or simulation program of the prior art such as the commercial products PVSYST, PVSOL or academic products SAM or collaborative products LADYBUG. Such modeling takes into account a multitude of parameters such as, in particular, the characteristics of the photovoltaic modules 14, their installation/orientation/inclination on the site 1 and their number and efficiency.

The modeling also includes the description of the wiring together of the different photovoltaic modules 14, or the description of the power conversion equipment (inverters, controllers, transformers, etc.) used for example.

It can also take into account the environment such as distant or close shading and self-shading.

Once this modeling has been completed, the numerical values are calculated and recorded in the database 30 so as to determine the photovoltaic power generated by the electricity production unit 12 thus modeled for all the predefined moments in the year (which is represented by block B3) and at the time interval defined by the user or by the software and for the irradiance values, for example the GHI, ranging in particular between 0 and 1100 W/m² by increments of 10 W/m² (embodiment shown in FIG. 3) or the coefficients of the mathematical function (embodiment in FIG. 5) that is represented by block B4, which allows the tables of the database 30 in FIG. 3 or 5 explained above to be obtained.

This calculation is therefore in particular made using known sizing and modeling software for photovoltaic facilities by taking into account the specific configuration of the electricity production unit 12 on the site 1.

These calculations, relatively consuming in terms of calculation power and specialized software, are only performed once to create the database 30. As described above, subsequent evaluations are made by simple reading or calculations of interpolation of values in said database 30. Moreover, the creation of such a database 30 is facilitated by the fact that the modeling of the energy supply facility 11 is often done at least once before its deployment and assembly on the site 1, particularly in the context of cost-benefit studies.

One of the advantages of using such a database 30 lies in the fact that the predictive or historic irradiance value takes some meteorological phenomena, such as the cloud layer for example, directly into account.

Method for Evaluating Photovoltaic Energy Production

Figure 7:
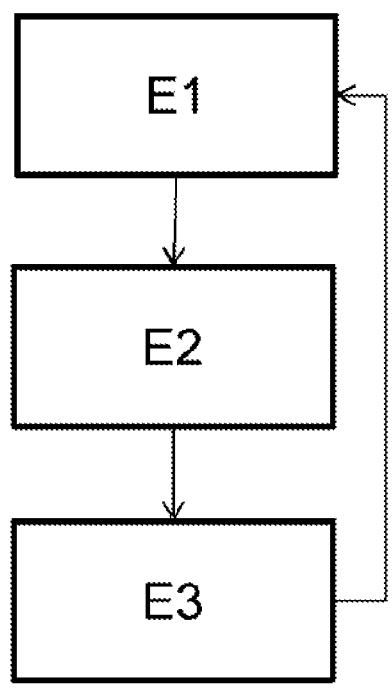
FIG. 7 is a flow diagram of an embodiment of a method for evaluating the photovoltaic electrical power generated.

FIG. 7 shows an embodiment of a method for evaluating the photovoltaic energy production for the energy supply facility 11 installed on the site 1.

According to a step E1, the past or predictive irradiance values are determined for the site 1 on which the energy supply facility 11 is installed, with respect to moments of the day spaced over intervals of time of between one second and two days, or even two years. This step E1 is in particular performed by the provision of irradiance values by the meteorological evaluations system 28 to the evaluation and management unit 16 thanks to the telecommunication means 26.

In the context of a predictive evaluation, the determination of irradiance and other meteorological parameters is performed for predictive time intervals of between one second and two days, in particular less than 5 min. Clearly, the shorter the predicted time interval, the more reliable the prediction of the irradiance values. Then the interval between two predictions of irradiance values can be chosen according to requirements, for example one prediction every 10 s in the case of the management of a local network 22, as will be explained below.

In the context of an historical evaluation, the meteorological parameters collected can cover past intervals of a few minutes to a few days.

The determination (prediction or collection) of meteorological parameters over a given predicted interval of time is defined over a time interval shorter than or equal to the given predicted interval of time, typically between one second and a few hours.

Then during a step E2, an evaluation is made of the photovoltaic power generated as a function of the determined irradiance values, the point of time in the year of this evaluation and the prerecorded generated power values 36 in the database 30 by simple reading or by calculation using the mathematical function and coefficients as detailed above for the two embodiments, if necessary by making linear interpolations for the irradiance 32 or the moment in the year 34.

According to an optional step E3, a step of correcting the prerecorded values 36 in the database 30 of the photovoltaic power generated is made taking into account predictive values, past or measured, of the temperature (in particular the temperature of the modules 14 or ambient temperature on the site 1) and/or the wind speed on the site 1 of installation by applying a correction coefficient, in particular a linear correction coefficient.

In fact, the photovoltaic modules 14 and particularly the cells that comprise them are the components whose photovoltaic conversion efficiency is linked quasi-linearly to the operating temperature of the cells. In the second order, the ambient temperature can limit the conversion efficiency of energy converters such as inverters.

The temperature can then for example be determined with the aid of a temperature sensor fixed to a module 14 and connected to the evaluation and management unit 16 or be the result of meteorological prediction calculations transmitted by the meteorological evaluation system 28.

On performing steps E1 and E2 or E1 to E3 in a loop with a sampling interval of five minutes or less, and in particular every second, accurate and rapid photovoltaic energy production evaluations can therefore be made.

If the sampling interval of the irradiance, temperature or wind speed values received exceeds that of the sampling interval of the evaluation calculations (the interval between two determinations of irradiance values is longer than the interval between two evaluations of electricity production), a first-approximation linear interpolation can also be used to refine the calculations.

The use of a database 30, in the form of a table for example, in order to determine the past or future theoretical photovoltaic power 36 generated by the electricity production unit 12 by simple determination (prediction or historical collection) of the irradiance enables the necessary calculation powers to be limited to a strict minimum. Thus, the use of such a database 30 facilitates the calculations and thus enables a simpler and faster determination of the photovoltaic power 36 generated by the energy supply facility 11 at any time of day and year. The use of this database 30 enables an almost instantaneous evaluation of the electrical power generated, which is not possible with the known sizing programs of the prior art.

Moreover, the use of such a database 30 enables automation of the determination of the photovoltaic power theoretically generated by the energy supply facility 11 with a fine sampling interval of 5 minutes or less, and in particular every minute.

The evaluation calculations can also be made on a physical machine or a virtual machine on cloud computing, which is not always possible with for example commercial photovoltaic sizing software.

These evaluations can be used to manage the local electrical network 22 for example or to perform an operating test on the electricity production unit 12.

Managing a Local Electrical Network 22

Figure 8:
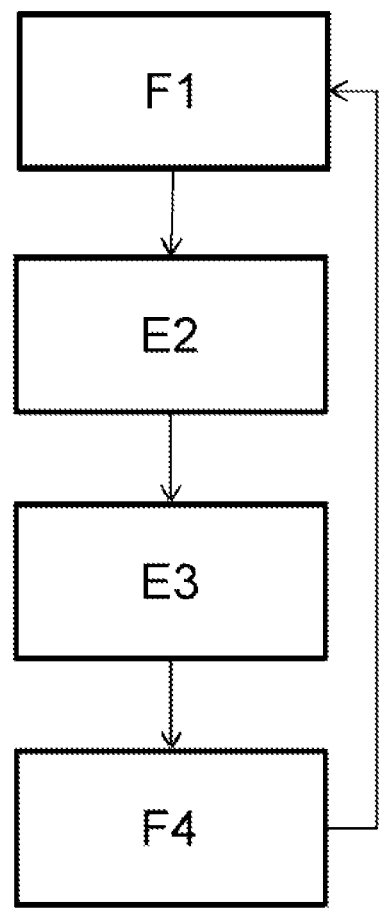
FIG. 8 is a flow diagram of an embodiment of a method for predicting photovoltaic energy production and managing electrical appliances.

FIG. 8 shows an embodiment of a method for predicting photovoltaic energy production and managing electrical appliances that is for example implemented by the evaluation and management unit 16 for managing the local electrical network 22.

According to step F1, which is similar to step E1 of FIG. 7, predictive meteorological parameters are collected (irradiance value, temperature on the site 1 and wind speed on the site 1 for example) for the site 1 where the energy supply facility 11 is installed. The values of the predictive meteorological parameters are for example provided by the meteorological evaluations system 28. Steps E2 and E3 then follow (E3 being optional) as described above in relation to FIG. 5.

Lastly, during a step F4, the evaluation and management unit 16 is configured to control the local electrical network 22 as a function of the prediction of the photovoltaic energy production of the energy supply facility 11.

This control of the local electrical network may involve one or more of the following actions in the non-exhaustive list such as for example:
  adapting the consumption of one or more electrical devices 10,
  storing electrical energy in the storage unit 18 and/or injecting it from the storage unit 18,
  starting or stopping one or more thermoelectric generators 20,
  drawing off or injecting electricity from or into the public network 24.

Method for Monitoring and Diagnosing Energy Production

Figure 9:
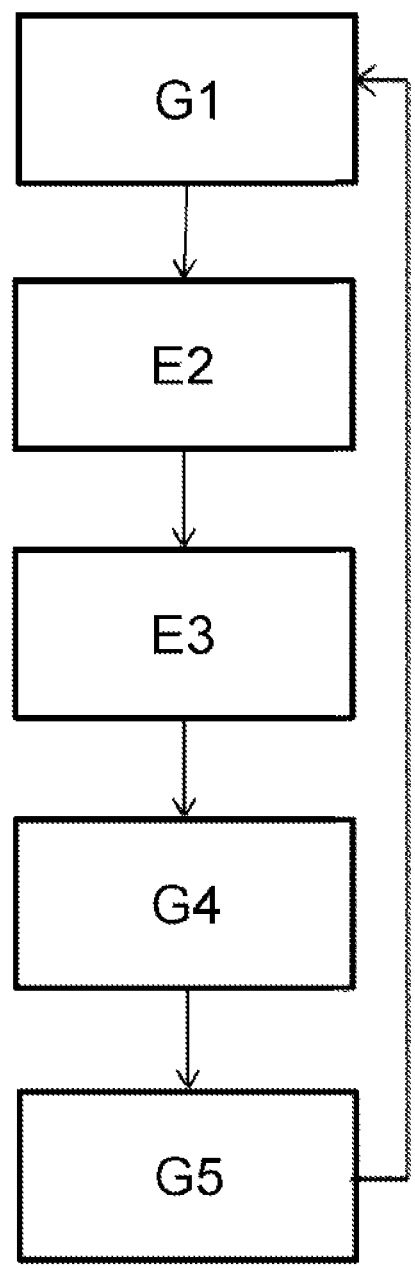
FIG. 9 is a flow diagram of an embodiment of a method for monitoring and diagnosing photovoltaic energy production.

The agility, speed and low consumption of calculation power also enables the evaluation method to be used in the context of a method for monitoring and diagnosing photovoltaic energy production for an energy supply facility 11 installed on a site 1, as shown schematically according to an embodiment in FIG. 9. The speed and calculation frugality of the method enables a large number of sites to be monitored frequently, using limited computing resources.

According to a step G1, which is similar to step E1 in FIG. 7, historic meteorological parameters are collected (irradiance value, temperature on the site 1 and wind speed on the site 1 for example) for the site 1 where the energy supply facility 11 is installed. The values of the historic meteorological parameters are for example supplied by the meteorological evaluations system 28 working on the basis of satellite images. According to a variation not shown, these historic values can be supplied by sensors on the site 1 and recorded for example in a memory of the evaluation and management unit 16.

Steps E2 and E3 then follow (E3 being optional) as described above in relation to FIG. 7. These steps E2 and E3 therefore enable a reference value to be provided that the energy supply facility 11 should have produced as a function of the irradiance and possibly of the temperature.

Then, during a step G4, the evaluation and management unit 16 is configured to compare the production of photovoltaic energy evaluated on the basis of historic meteorological values to the actual photovoltaic production measured during a past interval of time.

Lastly, according to a step G5, the evaluation and management unit 16 is configured to generate a warning if the difference between the evaluated photovoltaic energy production and the measured photovoltaic production during the past interval of time exceeds a predefined threshold.

In fact, if the measured value is significantly lower than the theoretical value (10% for example), it can be deduced that the energy supply facility 11 is subject to a malfunction such as the presence of dust or dirt on the photovoltaic modules 14, a string failure of the modules 14, etc. requiring a maintenance intervention.

The historic meteorological parameters can be collected with great accuracy and/or with a large amount of data. A finer evaluation of the theoretical power over time or even an evaluation over a longer interval of time is therefore possible using the same calculation power.

Clearly, therefore, one of the determining factors of the present invention lies in the use of a database 30 and in the choice of how this database 30 is organized in order to enable the production of electricity to be evaluated using prerecorded numerical values enabling the specific photovoltaic power of the facility 11 on the site 1 to be determined and on the basis of few variables that are for example a moment of the year (date+time enabling astronomic and geometric aspects to be taken into account) and irradiance (enabling the meteorological and astronomical aspects to be taken into account) or coefficients as explained above.

Moreover, with regard to the frequency of iteration of the method for predicting photovoltaic energy production, even short adverse meteorological conditions such as the passage of clouds for example, which would cause the irradiance on the photovoltaic modules 14 of the electricity production unit 12 to drop, can be used to predict the photovoltaic power generated by the energy supply facility 11.

Similarly, short adverse meteorological conditions would have less of an effect on the evaluation of the theoretical power with the readings of meteorological parameters sufficiently frequent and close together during the interval of time in question thanks to a short calculation time.

For this reason, the evaluation calculations can be made on a physical machine or a virtual machine on cloud computing.

The embodiments described above are given by way of non-limiting examples.

The invention claimed is:

1. A method for controlling a local electrical network comprising an energy supply facility comprising at least one electricity production unit having at least one photovoltaic module and one or more electrical device(s), electrical energy storage unit(s), thermodymanic generator(s), or connection(s) to public electrical network(s), or combinations thereof, the method comprising:

determining predictive irradiance values for the site on which the energy supply facility is installed, the determination being carried out for time intervals of between one second and two days;

evaluating the photovoltaic power generated as a function of the determined predictive irradiance values and numerical values prerecorded in a database, this database including, for each day of the year and different times of each day, prerecorded numerical values for determining the photovoltaic electrical power generated as a function of the irradiance; and reducing electrical consumption of an electrical device, drawing electrical energy from a storage unit, starting one or more thermoelectric generators, drawing electrical energy from the public network, or combinations thereof, if energy demand is greater than the photovoltaic power generated as a function of the determined predictive irradiance values and numerical values prerecorded in a database for a future time interval; or storing electrical energy in a storage unit, stopping one or more thermoelectric generators, injecting electrical energy into the public network, or combinations thereof, if energy demand is less than the photovoltaic power generated as a function of the determined predictive irradiance values and numerical values prerecorded in a database for a future time interval;

wherein the database comprises for each moment contained in the database electrical power values generated as a function of different levels of irradiance, the levels of irradiance ranging between 0 and 1300 W/m$^2$, in particular by increments of 10 W/m$^2$; and wherein the numerical values prerecorded in the database correspond to coefficients of a mathematical function describing values of electrical power generated as a function of irradiance.

2. The method of claim 1, characterized in that the numerical values prerecorded in the database correspond to photovoltaic electrical power values generated as a function of irradiance values.

3. The method of claim 1, characterized in that for a level of irradiance that is not indicated in the database and is located between two levels indicated in the database, the value of the photovoltaic electric power is determined by linear interpolation of the photovoltaic electrical power values indicated in the two levels of irradiance indicated in the database.

4. The method of claim 1, characterized in that the mathematical function is a polynomial.

5. The method of claim 4, characterized in that the coefficients of the mathematical function are determined by least-square regression of values of electrical power generated as a function of different irradiance values, the irradiance values ranging between 0 and 1300 W/m$^2$.

6. The method of claim 1, characterized in that it comprises a step to correct the photovoltaic electrical power generated as a function of irradiance, this correction step taking into account predictive, past or measured values of temperature and/or wind speed on the installation site by applying a correction coefficient.

7. The method of claim 6, characterized in that the correction coefficient is linear.

8. The method of claim 1, characterized in that the prerecorded numerical values are indicated in the database at least between the sunrise and sunset of each day with the times of day spaced over a time of between 5 min and 2 h.

9. The method of claim 8, characterized in that for a time of day that is not indicated in the database and is located between two times indicated in the database, the prerecorded numerical values are determined by linear interpolation of the prerecorded numerical values indicated at the two times indicated in the database.

10. The method of claim 1, characterized in that the evaluation of electrical energy production is made at a sampling interval of five minutes or less.

11. The method of claim 1
wherein during the step of determining the predictive irradiance values, historic irradiance values for the site on which the energy supply facility is installed are determined for a past time interval, and the method further comprising:
evaluating photovoltaic power generated as a function of the historic irradiance values and numerical values prerecorded in the database; and
comparing the photovoltaic power generated as a function of the predictive irradiance values with the photovoltaic power generated from the past time interval.

12. The method of claim 11, characterized in that it also comprises a step of generating a warning if the difference between the power generated as a function of the predictive irradiance values and the photovoltaic power generated from the past time interval exceeds a predefined threshold.

13. The method of claim 1, wherein controlling the local electrical network occurs in real time.

14. A computer-implemented method for controlling a local electrical network comprising an energy supply facility comprising at least one electricity production unit having at least one photovoltaic module and one or more electrical devices, comprising executing on a processor the steps of:
determining predictive irradiance values for the site on which the energy supply facility is installed, the determination being carried out for time intervals of between one second and two days;
evaluating the photovoltaic power generated as a function of the determined predictive irradiance values and numerical values prerecorded in a database, this database including, for each day of the year and different times of each day, prerecorded numerical values for determining the photovoltaic electrical power generated as a function of the irradiance; and
reducing electrical consumption of one or more electrical devices if energy demand is greater than the photovoltaic power generated as a function of the determined predictive irradiance values and numerical values prerecorded in a database for a future time interval;
wherein the database comprises for each moment contained in the database electrical power values generated as a function of different levels of irradiance, the levels of irradiance ranging between 0 and 1300 $W/m^2$, in particular by increments of 10 $W/m^2$; and
wherein the numerical values prerecorded in the database correspond to coefficients of a mathematical function describing values of electrical power generated as a function of irradiance.

15. The method of claim 14, wherein the local electrical network further comprises one or more of electrical energy storage unit(s), thermodymanic generator(s), or connection(s) to a public electrical network, or combinations thereof, and the method further comprises:
storing electrical energy in a storage unit, stopping one or more thermoelectric generators, or injecting electrical energy into the public network if energy demand is less than the photovoltaic power generated as a function of the determined predictive irradiance values and numerical values prerecorded in a database for a future time interval; or
drawing electrical energy from a storage unit, starting one or more thermoelectric generators, or drawing electrical energy from the public network if energy demand is greater than the photovoltaic power generated as a function of the determined predictive irradiance values and numerical values prerecorded in a database for a future time interval.

* * * * *